United States Patent
Cameron et al.

(10) Patent No.: US 9,896,735 B2
(45) Date of Patent: *Feb. 20, 2018

(54) METHOD FOR HEATING A BLAST FURNACE STOVE

(75) Inventors: Andrew Cameron, Tansley (GB); Tomas Ekman, Saltsjö-boo (SE); Mats Gartz, Sollentuna (SE)

(73) Assignee: Linde Aktiengesellschaft, Munich (DE)

( * ) Notice: Subject to any disclaimer, the term of this patent is extended or adjusted under 35 U.S.C. 154(b) by 565 days.

This patent is subject to a terminal disclaimer.

(21) Appl. No.: 13/510,108

(22) PCT Filed: Nov. 25, 2010

(86) PCT No.: PCT/SE2010/051301
§ 371 (c)(1),
(2), (4) Date: Aug. 20, 2012

(87) PCT Pub. No.: WO2011/065907
PCT Pub. Date: Jun. 3, 2011

(65) Prior Publication Data
US 2012/0322017 A1    Dec. 20, 2012

(30) Foreign Application Priority Data

Nov. 26, 2009 (SE) .................................. 0950900
Nov. 26, 2009 (SE) .................................. 0950901

(51) Int. Cl.
*C21B 9/10* (2006.01)

(52) U.S. Cl.
CPC ............ *C21B 9/10* (2013.01); *C21B 2100/60* (2017.05); *Y02P 10/122* (2015.11); *Y02P 10/132* (2015.11)

(58) Field of Classification Search
USPC ........... 432/30, 217, 247; 166/156; 431/4, 5, 431/115, 116
See application file for complete search history.

(56) References Cited

U.S. PATENT DOCUMENTS

| 2,598,735 A | 6/1952 | Webb |
| 3,153,532 A | 10/1964 | Touzalin |

(Continued)

FOREIGN PATENT DOCUMENTS

| CN | 1888083 A | 1/2007 |
| DE | 26 09 799 B1 | 6/1977 |
| FR | 2 847 659 A1 | 5/2004 |
| GB | 715958 A | 9/1954 |
| GB | 983499 A | 2/1965 |
| GB | 998 129 A | 7/1965 |
| WO | WO 99/026020 A1 | 5/1999 |
| WO | WO 2004/094797 A2 | 11/2004 |

(Continued)

OTHER PUBLICATIONS

Ambrogio Milani and Joachim Wunning. "What is flameless combustion?". Apr. 15, 2002. International Flame Research Foundation (IFRF). Version 1. 8 pages.*

(Continued)

*Primary Examiner* — Steven B McAllister
*Assistant Examiner* — Ko-Wei Lin
(74) *Attorney, Agent, or Firm* — Joshua L. Cohen

(57) ABSTRACT

A method for heating a blast furnace stove includes combusting a fuel with a lower heating value (LHV) of 9 MJ/Nm$^3$ or less in a combustion zone which is arranged in a combustion chamber in the stove, and causing the combustion gases to flow through and thereby heat refractory material in the stove. The fuel is combusted with an oxidant including at least 85% oxygen, and combustion gases are recirculated into the combustion zone for diluting the mixture of fuel and oxidant therein sufficiently for the combustion to be flameless.

14 Claims, 3 Drawing Sheets

(56) References Cited

U.S. PATENT DOCUMENTS

| | | | |
|---|---|---|---|
| 3,602,487 | A | 8/1971 | Johnson |
| 3,892,517 | A | 7/1975 | Ebeling et al. |
| 4,169,700 | A | 10/1979 | Yoshioka et al. |
| 4,444,555 | A * | 4/1984 | Edwardsen et al. ............ 432/30 |
| 6,398,547 | B1 * | 6/2002 | Joshi et al. .................... 432/54 |
| 6,436,337 | B1 | 8/2002 | Gross |
| 6,813,902 | B2 * | 11/2004 | Streicher et al. .............. 65/21.1 |
| 2009/0120338 | A1 * | 5/2009 | Adendorff et al. ........... 110/345 |

FOREIGN PATENT DOCUMENTS

| | | |
|---|---|---|
| WO | WO 2005/083130 A1 | 9/2005 |
| WO | WO 2010/133476 A1 | 11/2010 |
| WO | WO 2011/065907 A1 | 6/2011 |

OTHER PUBLICATIONS

International Search Report PCT/US2012/022293, dated May 10, 2012, Authorized Officer: Blaine R. Copenheaver, 9 pp.

W. Kowalski, K-H Peters, W. Cronert, P. Kuhn, D. Sucker, Optimierung de Brenner von Winderhitzern im Hinblick auf einen hohen Co-Ausbrand, Stahl Und Eisen, Verlag Stahleisen, Nov. 1, 1990, pp. 41-50, vol. 110, No. 11, Dusseldorf, DE.

G. Bisio, Energy Savings in Blast Furnace Regenerators, Proceedings Intersociety Energy Conversion Engineering Conference, Jan. 1, 1989, pp. 75-80, vol. 4, University of Genova, Genoa, Italy.

I. J. Cox, The Effect of Blast Furnace Gas Quality and Combustion Controls on Hot Blast Stove Performance, AISE Steel Technology, May 1, 2003, pp. 37-41, vol. 80, No. 5, AISE, Pittsburgh, PA, USA.

R. Van Laar, J. Barel, The Future of Hot Blast Stoves, AISTech 2010 Proceedings of the Iron & Steel Technology Conference, May 3-6, 2010, pp. 587-595, vol. 1, Pittsburgh, PA, USA.

European Search Report for EP11 250 727, dated Nov. 18, 2011, Authorized Officer: Alexandru Gavrillu, 9 pp.

International Search Report PCT/SE2010/051301, dated Feb. 17, 2011, Authorized Officer: Johan Kjellgren, 5 pp.

European Search Report for EP11 17 1403, dated Sep. 13, 2011, Authorized Officer: Cosmin Catana, 5 pp.

European Search Report for EP11 25 0609, dated Sep. 21, 2011, Authorized Officer: Cosmin Catana, 6 pp.

* cited by examiner

METHOD FOR HEATING A BLAST FURNACE STOVE

BACKGROUND OF THE INVENTION

The present invention relates to a method for heating a blast furnace stove for use with a blast furnace.

The combustion air supplied to a blast furnace is typically preheated using a stove, comprising refractory material which is heated using a burner. When the material is hot enough, combustion air is passed through the stoves to pre-heat it before injection into the blast furnace. Usually, several stoves are operated in parallel and cyclically so that at least one stove is operated for heating combustion air while the refractory material of at least one stove is heated.

Conventionally, the top gas leaving the blast furnace has a temperature of around 110-120° C. and contains about 20-25% each of CO and $CO_2$. Typically, 3-5% $H_2$ and some $H_2O$ will also be present, but the other major constituent of the top gas is $N_2$ (typically 45-57%). The gas constitutes a low grade fuel, having a relatively low heating value, and is commonly used to fuel the stoves.

The top gas is normally combusted using air-fuel burners in the stoves. In order to ensure the necessary high air blast temperatures needed by the blast furnace, it is known to enrich the top gas with a high calorific value gas, such as coke oven gas or natural gas. The combustion of such additional fuel leads to larger overall emissions of carbon dioxide from the plant, and is therefore not desirable.

It is also known to oxygen enrich the combustion air used in stack burners. Usually, the enrichment levels needed to reduce or eliminate the need for additional, high-calorific fuels are such as to result in a final oxidant oxygen content in the combustion air of around 28-30%.

Such methods may in some cases render peak flame temperatures high enough to damage the refractory material of the stove, and it may be necessary for example to supply an excess air rate to suppress the flame temperature.

It is further known to pre-heat, using heat recovery units, the fuel and air fed to the stove burners.

All the above-described methods add complexity to the process and require costly equipment.

The blast furnace itself is a highly efficient counter-current reactor that has evolved over many years. It is approaching the limits of thermodynamic efficiency, which is why it is difficult to reduce energy consumption relative to current best operating practices. Moreover, the blast furnace and its ancillary equipment, such as stoves, are the largest energy consumers in an integrated iron and steel works. Furthermore, the energy consumed in iron making is the dominant factor determining the carbon consumption of the integrated steel making process, and therefore the emissions of carbon dioxide. Therefore, it would be desirable to increase thermal efficiency of blast furnace stoves.

Using so-called "carbon capture" techniques, it is possible to separate carbon dioxide from the stove flue gas, in order to lessen emissions. However, such separation is relatively expensive. Therefore, it would be desirable to design a blast furnace stove allowing cheaper carbon capture.

In addition to the problem of high peak temperatures mentioned above, too low flame temperatures or heat input rates will lead to long heating cycles, which is undesirable. In other words, the flame temperature needs to be moderated.

The present invention solves the above described problems.

SUMMARY OF THE INVENTION

Thus, the present invention relates to a method for heating a blast furnace stove by combusting a fuel with a lower heating value (LHV) of 9 $MJ/Nm^3$ or less in a combustion zone, arranged in a combustion chamber in the stove, and causing the combustion gases to flow through and thereby heat refractory material in the stove, and is characterized in that the fuel is combusted with an oxidant comprising at least 85% oxygen, and in that combustion gases are caused to be recirculated into the combustion zone and thereby diluting the mixture of fuel and oxidant therein sufficiently for the combustion to be flameless.

BRIEF DESCRIPTION OF THE DRAWINGS

In the following, the invention will be described in detail, with reference to exemplifying embodiments of the invention and to the appended drawings, in which:

FIG. 1 illustrates the principal arrangement of a blast furnace 120 and three stoves 100 in an iron works. The operation of the blast furnace 120 produces blast furnace top gas, which is fed, using a fuel supply control device 110, to each stove 100 to be used as fuel to heat the stove 100 in question. The top gas is combusted with an oxidant in the form of air, which is supplied by an air supply control device 130.

Each stove 100 comprises refractory material in the form of ceramic bricks or the like, which is first heated and then used to heat blast air which is fed into the blast furnace.

When operated in refractory material heating mode ("on gas" mode), the top gas is combusted in the stove 100 with the oxidant, and the combustion gases are fed to a flue gas treatment device 150, possibly including a conventional carbon capture step.

When operated in blast air heating mode ("on blast" mode), air is led through the refractory material in the opposite direction, and then on to the blast furnace 120.

The stoves 100 are operated cyclically, so that at any point in time at least one stove is operated on blast and the rest of the stoves are operated on gas.

Figure 1:
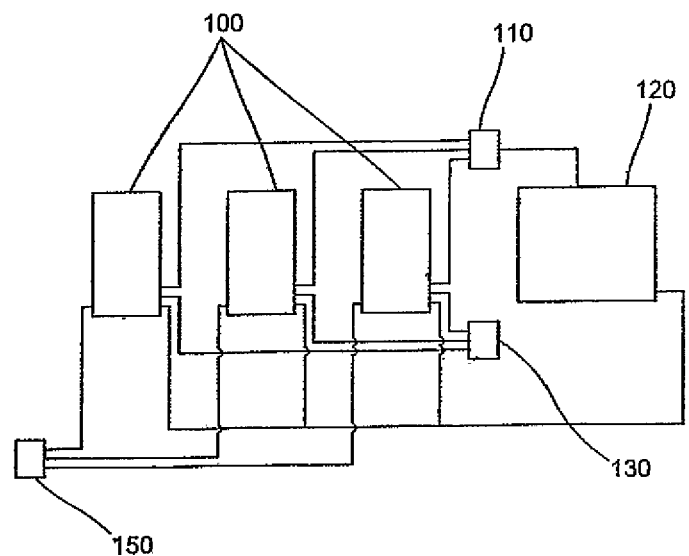
FIG. 1 is a simplified illustration of a blast furnace and three stoves in a conventional iron works.
Figure 2:
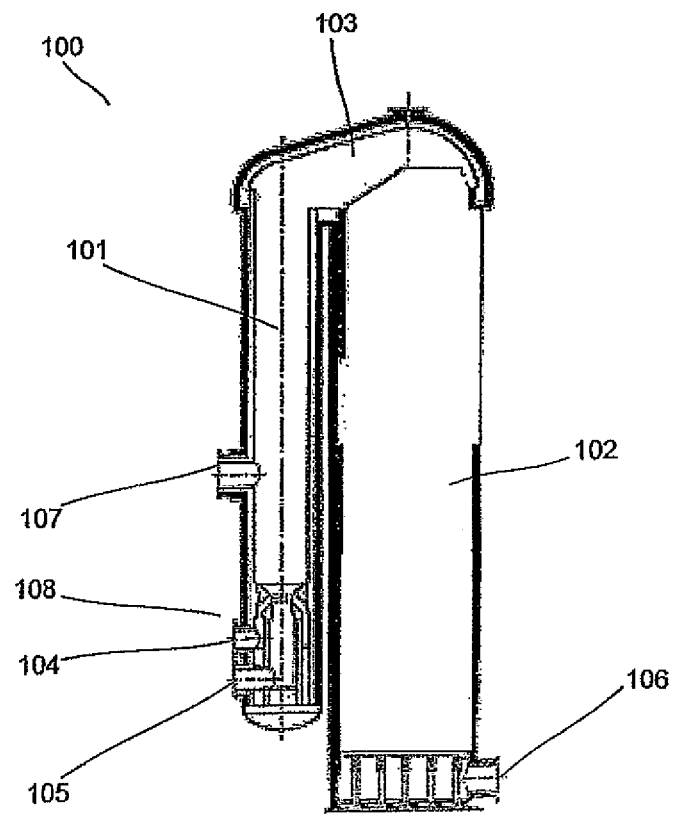
FIG. 2 is a section view illustrating a conventional stove of a modern type with external combustion chamber.

FIG. 2 is a section view through a conventional stove 100 of a modern type. The stove 100 comprises an external combustion chamber 101, refractory material 102 and a dome 103. When operated on gas, it is critical that the temperature in the dome 103 does not become too high, since there is then a risk of damage to the stove 100. It is to be understood that there are also stoves with internal combustion chambers, and that the present invention is equally applicable to the operation of such stoves.

When operated on gas, top gas and air is fed into a combustion zone of the combustion chamber 101, in which combustion takes place, via an air burner 108. The burner 108 comprises a fuel inlet 105 and an air inlet 104. The hot combustion gases then stream up through the chamber 101, past the dome 103 and down through the refractory material 102, thereby heating the latter. When exiting through the port 106, the temperature of the combustion gases is conventionally about 200-350° C.

When the refractory material has reached a predetermined temperature, the operation is switched to on blast operation. Then, air is introduced through the port 106, streams through the hot refractory material 102, via the dome 103 and the combustion chamber 101, and out through an outlet port 107. At this point, the blast air has a typical temperature of 1100-1200° C.

DETAILED DESCRIPTION OF THE INVENTION

It is preferred, in the context of the present invention, to heat the stove with blast furnace top gas, as described above. It is furthermore preferred to use top gas from a blast furnace to which blast air is provided from the stove. This allows for the arrangement of the stove near the blast furnace, is energy efficient and leads to low total emissions from the plant.

However, it is to be understood that the present invention can be equally advantageously applied to stoves heated with other low-grade fuels. By way of example, typical chemical compositions (percentage values) and lower heating values (LHV) are provided in Tables I and II, respectively, for blast furnace top gas and converter off-gas.

TABLE 1

|  | $N_2$ $H_2O$ | $O_2$ | $H_2$ | CO | $CO_2$ | $CH_4$ | $C_mH_n$ |
|---|---|---|---|---|---|---|---|
| Top gas | 52.5 1.15 | 0.55 | 2.3 | 23.5 | 20 | — | — |
| Off-gas | 17.2 0.1 | 0.1 | 2.5 | 64.5 | 15.6 | — | — |

TABLE 2

|  | LHV (MJ/Nm$^3$) | LHV (MJ/kg) |
|---|---|---|
| Top gas | 3.2 | 2.4 |
| Off-gas | 6.3 | 8.4 |

According to the present invention, the stove is heated with a gaseous fuel the LHV value of which is not higher than 9 MJ/Nm$^3$. Use of such low-grade fuel will draw maximum benefit from the possible cost benefits of the present invention. The fuel may comprise a certain addition of another, more high-grade fuel, as long as the LHV value of the mixture is equal to or less than 9 MJ/Nm$^3$. In order to minimize cost and emissions, it is however preferred not to add high grade fuels prior to combustion.

According to the present invention, such a low-grade fuel is used for heating the stove by combusting it, not with air or slightly oxygen-enriched air, but with an oxidant comprising at least 85% by weight, preferably at least 95% by weight, oxygen, where the oxidant most preferably is industrially pure oxygen having an oxygen content of essentially 100%.

This will increase fuel efficiency, since the nitrogen ballast present in air does not need to be heated. Moreover, by reducing the nitrogen ballast in the combustion products, the necessary flame temperatures can be attained without the need to supplement the low-grade fuel gas with high calorific fuels. The reduced energy demand will facilitate increased power generation and/or lead to a reduced need for import gas, thus improving fuel management.

Normally, using an oxidant with such large oxygen contents would lead to peak temperatures high enough to damage the dome and refractory material of the stove.

However, the present inventors have discovered that it is possible to use this type of oxidant under condition that the stove combustion gases are recirculated into the combustion zone to such extent that the mixture of fuel and oxidant therein is diluted sufficiently for the combustion in the combustion zone to be of the type normally referred to as "flameless". Herein, a "flameless" combustion denotes a flameless oxidation mode, achieved by the oxidant and fuel gas being heavily diluted with recirculated exhaust fumes before the main part of the combustion process takes place in the combustion zone. In this way, a combustion is achieved with no visible flame, in other words a flame which is not or almost not visible to the human eye. Another way to express this is that the combustion reactants are so diluted that the combustion is a "volume type" combustion, without a stable flame.

That "combustion gases are recirculated into the combustion zone" herein refers to that combustion gases located outside of the combustion zone are recirculated back into the combustion zone. Such combustion gases may originally be located inside the combustion chamber itself, but outside of the part of the combustion chamber occupied by the zone in which combustion mainly takes place (the "combustion zone"). Thus, in this case combustion gases are in fact recirculated within the combustion chamber. Alternatively, such combustion gases may be recirculated from outside of the combustion chamber back to the combustion zone.

As will be described in further detail in the following, the dilution of the reactants may be achieved either by creating heavy turbulence inside the combustion chamber using high-velocity lancing of oxidant, possibly using a staged combustion scheme, and/or the recycling of flue gases from the stove back into the combustion zone.

It has been found that, using such flameless combustion with an oxidant with very large oxygen contents, it is possible to achieve sufficiently low peak flame temperatures so as not to damage the stove. Also, sufficiently high flame temperatures are achievable.

Additionally, when a high-oxygen oxidant is used to combust low-grade fuels such as blast furnace top gas, the $CO_2$ contents of the combustion gases become considerably higher as compared to when using air or slightly oxygen-enriched air as the oxidant. Since conventional carbon capture techniques tend to be considerably cheaper per unit captured $CO_2$ when the treated gas contains a larger share of carbon dioxide, this leads to considerable cost savings when using such a carbon capture step to treat the stove combustion gases.

Figure 3:
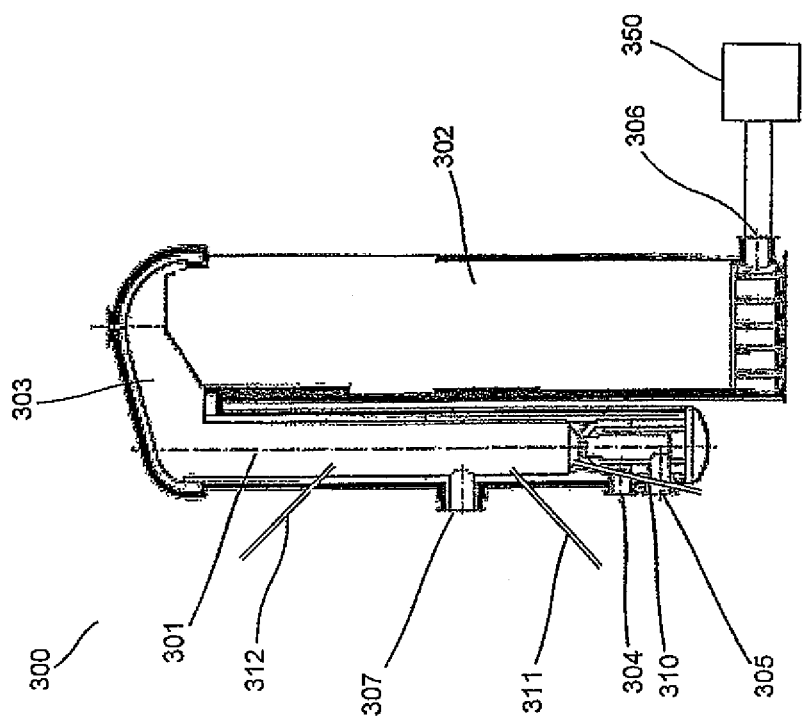
FIG. 3 is a section view of a stove with additional lances according to the present invention.

FIG. 3 shows a preferred embodiment of the invention. A stove 300, which is similar to the conventional one 200 shown in FIG. 2, comprises a combustion chamber 301, refractory material 302, a dome 303, an inlet 304 used for combustion air when the stove is operated in a conventional manner with air combustion, another inlet 305 used for low-grade fuel such as top gas, and ports 306, 307 similar to ports 106,107. Instead of combusting the low-grade fuel with air, one or several lances 310, 311, 312 are inserted into the combustion chamber, and are used to supply the above defined high-oxygen oxidant into the combustion zone. The oxidant may be provided by local oxygen production or using an externally provided oxidant.

In all embodiments described herein, the total amount of oxidant per time unit is balanced against the amount of supplied low-grade fuel, so as to create the desired combustion conditions in terms of stoichiometry.

It is preferred that each lance 310, 311, 312 supplies oxidant to the combustion zone at high velocity, preferably at least 200 m/s, more preferably at least sonic velocity. Such high-velocity lancing leads to heavy turbulence in the combustion chamber, in turn entraining combustion gases into the combustion zone and thereby diluting the flame so as to achieve flameless combustion.

According to one preferred embodiment, a lance 310 is arranged with its orifice in close proximity to the orifice of the fuel inlet 305. According to another preferred embodiment, a lance 311 is arranged at a position at a distance from the orifice of the fuel inlet 305. Depending on the geometry of the combustion chamber 301, one of these arrangements, or a combination of both, may provide the best recirculation of combustion gases into the combustion zone. A supplementary lance 312, arranged further downstream in relation to the other lance or lance 310, 311, can be used to provide a staged combustion process, whereby the total flame volume can be made even larger. Naturally, more than one lance of each of the described types 310, 311, 312 may be arranged to complement each other. In case the oxidant is lanced in close proximity to the fuel inlet 305, it is preferred to also lance oxidant further downstream so as to create a staged combustion process.

Figure 4:
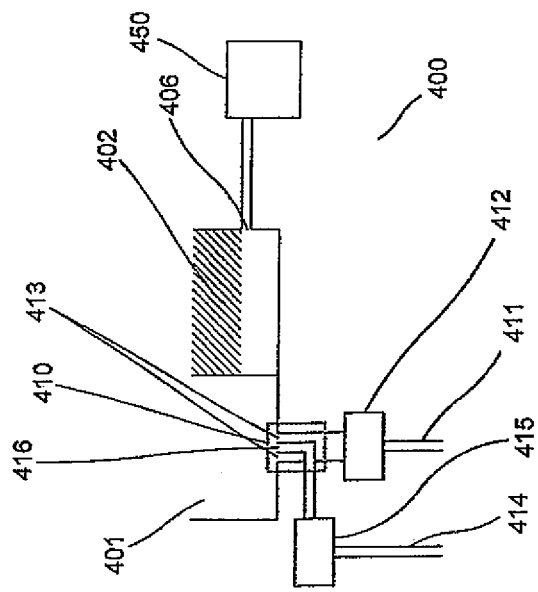
FIG. 4 is a detail section view of a stove with an oxyfuel burner according to the present invention.

FIG. 4 is an overview illustration of another preferred embodiment, in which a blast furnace stove 400 comprises a combustion chamber 401, refractory material 402 and a port 406.

Figure 6:
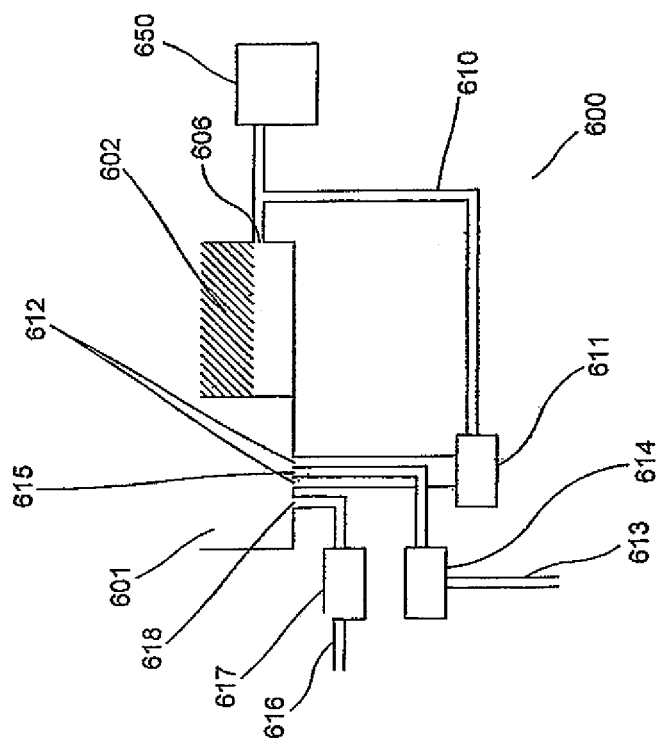
FIG. 6 is a detail section view of a stove with an ejector lance according to the present invention.

Low grade fuel is supplied via a supply conduit 411, a supply device 412 and an inlet 413. Oxidant is supplied via a supply conduit 414, a supply device 415 and a lance comprising an orifice 416. The lance is arranged so that its orifice 416 is arranged adjacent to the fuel inlet 413. Preferably, the lance runs coaxially to the fuel inlet 413, as depicted in FIG. 6. By such an adjacent arrangement, especially when coaxial, and when the oxidant is lanced at the above described high velocities, the fuel is efficiently entrained into the combustion zone by ejector action on the part of the high velocity oxidant. As a result, heavy recirculation of combustion products is achieved in the combustion chamber 401, in particular recirculating combustion gases into the combustion zone expanding the flame front. When such a high-velocity lance is arranged adjacent to the fuel inlet 413, it is preferred to simultaneously use a secondary oxidant lance 312, providing part of the totally supplied oxygen at another location in the combustion chamber 401 downstream of the fuel inlet 413, creating a staged combustion of the low-grade fuel and thereby facilitating the achievement of a flameless combustion.

According to a very preferred embodiment, an existing, conventional, air burner, which was used to heat the existing stove 400 previously, is in an initial step replaced by an oxyfuel burner 410 comprising the above described fuel inlet 413 and oxidant lance. An "oxyfuel" burner herein refers to a burner driven with a fuel and an oxidant, wherein the oxidant comprises a large part oxygen, preferably at least 85% oxygen, more preferably at least 95% oxygen.

According to an alternative, very preferred embodiment, the existing air burner described above is, in an initial step, supplemented with one or several high-velocity oxidant lances as described above, and the air supply is terminated.

As described above, such high velocity lancing yields heavy turbulence inside the combustion chamber 301, 401, leading to a flameless combustion and hence sufficiently low peak flame temperatures.

However, the mass flow rate of the combustion gases will be lower when using a high-oxygen oxidant as compared to when using air as the oxidant. This will lead to smaller convective heat transfer to the refractory material and hence longer heating cycle times. Therefore, when converting an existing stove for high-oxygen oxidant operation, it is preferred to recycle flue gases from the stove back into the combustion zone as described below in connection to FIGS. 5 and 6.

Figure 5:
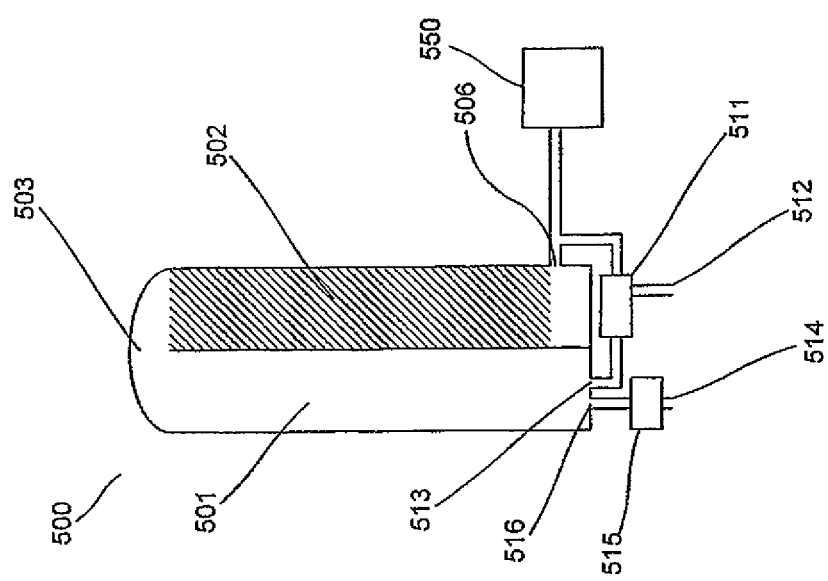
FIG. 5 is a section view of a stove with combustion gas recycling according to the present invention.

Thus, FIG. 5 is an overview illustration of a stove 500 according to another preferred embodiment, comprising a combustion chamber 501, refractory material 502 and a dome 503.

During on gas operation, the combustion gases leave the stove 500 through a port 506. However, part of the combustion gases are recycled back to the combustion zone in the combustion chamber 501 via a recycling device 511. The recycling device 511 may include a propelling device, such as a fan, to feed the recycled combustion gas to the combustion chamber 501.

The recycling device 511 is also arranged to mix the recycled combustion gas with a high-oxygen oxidant of a composition as described above, provided via a supply conduit 512. The mixing may take place using conventional diffusers. The mixture of recycled combustion gas and oxidant is then supplied to the combustion chamber 501 via an inlet 513. A low-grade fuel, such as top gas, is provided, via a supply conduit 514, a supply device 515 and an inlet 516. In the combustion zone, the fuel is hence combusted with the oxidant in the presence of the combustion gases that have been recycled into the combustion zone after they have already past the stove 500. This way, the flame in the combustion chamber 501 is diluted.

Using such flue gas recycling, it has been found that it is possible to reach convective heat transfer rates high enough so as to be able to maintain the heating cycle time of an existing stove in which a method according to the present invention is applied. This is achieved by recycling a sufficient amount of combustion gases to maintain the gas mass or thermal energy flow per time unit through the stove 500, at a level which is at least the same as the gas mass or thermal energy flow per time unit which was used when the existing stove was operated, prior to conversion to operation according to the present invention, using a low-oxygen oxidant with no recycling.

This involves balancing the amount of recycled combustion gases to the provided amount of low-grade fuel and oxidant per time unit. Table 3 illustrates an example of such a balance, in which a first mode of operation, in which coke oven gas enriched blast furnace top gas is combusted with air, without recycling, is described and compared to a corresponding second mode of operation, in which industrially pure oxygen is used as the oxidant and a certain amount of recycling is introduced in accordance to the present invention. As can be seen from Table 3, the flame temperature and gas mass flow through the refractory material 502 of the stove 500 are maintained at essentially the same level when applying the inventive method, at the same time as the combustion heat is reduced.

TABLE 3

| Operation mode | Air flow (Nm³/h) | Top gas (Nm³/h) | Coke oven gas (Nm³/h) | $O_2$ (Nm³/h) | Combustion heat (GJ/h) | Flame temperature (° C.) | Gas mass flow through stove (kg/min) | Flue gas recycle ((Nm³/h) | Flue gas volume vented (Nm³/h) | Flue gas $CO_2$ contents (%) |
|---|---|---|---|---|---|---|---|---|---|---|
| Conventional | 48502 | 40408 | 4045 | 0 | 208 | 1448 | 1988 | 0 | 86567 | 23 |
| With recycle | 0 | 60222 | 0 | 8538 | 194 | 1372 | 1939 | 21345 | 60991 | 43 |

In the "conventional" operation mode of Table 3, four stoves are operated in order to deliver 195000 Nm³/h of blast air at a temperature of 1125° C. To heat this volume of air from ambient temperature requires 308 GJ of energy per hour, provided by having two stoves 'on blast'. Hence, the overall stove efficiency, defined as (energy in blast air)/(heat of combustion supplied to stoves), is 308/(2·208) or about 74%. Some of this inefficiency is associated with the flue gas sensible heat.

The recycling device 511 is arranged to recycle enough combustion gases so as to render the combustion in the combustion zone flameless by lowering the oxygen concentration in the combustion chamber 501.

In order to render the combustion in the combustion zone flameless, it has been found that a total oxygen percentage by volume of not more than about 12%, preferably not more than 10%, of the inert part of the atmosphere in the combustion chamber 501, not counting the fuel components combustion gases, will effectively yield a flameless combustion. Therefore, it is preferred that a sufficiently large amount of combustion gases is recycled to yield a continuous concentration of oxygen in the combustion chamber 501 which is equal to or lower than this percentage.

Since all oxidant is supplied to the combustion chamber 501 via the recycling device 511 and possibly through one or several oxidant lances 310, 311, 312, the amount of oxygen supplied per time unit is known. Hence, one may calculate the amount of combustion gases to recycle per time unit in order to reach the above described, sufficiently low, oxygen concentrations.

In the example of Table 3, an $O_2$ concentration of 11% is desired, while for each unit volume $O_2$, 1/0.11−1≈8.1 units of inert gas is needed. For each volume unit top gas supplied, about 0.14 volume units of $O_2$, in the form of an oxidant comprised of industrially pure oxygen, is supplied in order to achieve the desired Lambda of about 1.125. This means that about 1/0.14≈7.1 units of fuel is supplied for each unit of oxygen. Since about 75% by volume of top gas is constituted of inert gases, and keeping the decimal precision from previous calculation steps, each volume unit $O_2$ in the combustion chamber 501 is already diluted with about 7.1*0.75≈5.4 (7.1×0.75≈5.4) units of inert gas only by providing the top gas fuel. In other words, an extra 8.1−5.4=2.7 units of inert gas in the form of combustion gas recycling will be needed per unit lanced $O_2$ into the combustion chamber 501. This means that at least about 38% of the combustion gases should be recirculated in order to reach a maximum $O_2$ concentration of 11%.

The corresponding example reaching 11% $O_2$ concentration in the combustion chamber using converter off-gas as fuel, which off-gas requires 0.33 volume units of $O_2$ per volume unit off-gas and contains only about ⅓ per volume inert gases, yields a required admixture of at least 7.1 volume units combustion gases per unit volume lanced $O_2$, or a flue gas recirculation of at least about 234%.

According to one preferred embodiment, all of the oxidant is premixed with the recycled combustion gases before entering the combustion zone. However, additional oxidant may also be supplied through one or more lances in the combustion chamber 501. In this case, it is the total amount of supplied oxygen per time unit which must be used as the basis for calculation of the amount of recycled combustion gases.

Moreover, as can be deduced from the figures given in Table 3, the heat supplied by combustion can be reduced by some 7%, while essentially maintaining the gas mass flow rate and flame temperature. It has been found that by operating the stoves in an integrated iron and steel works according to this example, with flameless oxyfuel and capturing of the $CO_2$ from the flue gas, it is possible to reduce the emissions from the plant by around 20%.

According to a preferred embodiment, enough combustion gases are recycled to essentially maintain or increase the gas mass flow per time unit through the refractory material.

According to an alternative preferred embodiment, enough combustion gases are recycled to essentially maintain or increase the thermal energy throughput through the refractory material. This takes into consideration the different heat capacities for various inert components in the combustion gases. In this case, it is also preferred that enough combustion gases are recycled so that the flame temperature is essentially maintained or decreased.

As is also shown in Table 3, the $CO_2$ contents of the flue gases vented from the stove 500 are much higher −43% as compared to 23% in the conventional operation mode. The costs per unit weight captured $CO_2$ for conventional carbon capture techniques is significantly decreased as the $CO_2$ concentration increases from low levels up to a level of roughly 50-60%. Concentrations increased beyond this limit will provide smaller gains. As a result, the costs for a carbon capture step for treating the stove flue gases may be reduced significantly per unit weight captured $CO_2$ when a high-oxygen oxidant is used in accordance with the present invention.

According to a very preferred embodiment, an existing, conventional, air burner, which was used to heat the existing stove 500 previously, is in an initial step replaced by a fuel inlet 516 and an inlet for recycled combustion gases 513, and the fuel is then combusted with the above described high oxygen oxidant. To this end, it is preferred that the oxidant is submitted by premixing with the recycled combustion gases. It is alternatively preferred that such premixing is combined with one or several lances as described above.

FIG. 6 is an overview illustration of another preferred embodiment of the present invention, showing a blast furnace stove 600 with a combustion chamber 601, refractory material 602, a port 606, a conduit for recycled combustion gases 610, a recycle device 611, a fuel supply conduit 616, a fuel supply device 617 and a fuel inlet 618.

Oxidant is supplied via an oxidant supply conduit 613 and an oxidant supply device 614 to an oxidant lance arranged so that the orifice 615 of the lance is arranged adjacent to an orifice 612 for supply of recycled combustion gases, supplied from the recycle device 611. Preferably, the oxidant lance runs coaxially with the recycled combustion gas inlet 612. In a way which is similar to the function of the coaxial lance orifice 416 as described in connection to FIG. 4, such an adjacent arrangement, especially when coaxial, will efficiently entrain the recycled combustion gases into the combustion zone by ejector action on the part of the high velocity oxidant, creating more combustion gas recirculation in the combustion chamber 601. At the same time, there is no need for a separate propelling device in the recycle device 611, since the recycled combustion gases will be propelled by the ejector action at the orifice 615.

The embodiment shown in FIG. 6 is advantageously combined with an additional oxidant lance, providing additional oxidant at a location in the combustion zone located at a distance from the orifice 615, thereby achieving a staged combustion in the combustion zone.

As indicated above, it is furthermore preferred that the stove 300, 400, 500, 600 is connected to a respective carbon capture step 350, 450, 550, 650, which may be conventional per se, separating the carbon dioxide contents of the combustion gases vented from the stove before the combustion gases are released into the environment.

When the age of a blast furnace stove approaches its expected useful life, it is preferred to apply one of the herein described embodiments, or a combination of several of them, to the stove.

This way, the useful life of the stove may be prolonged, operating it with lower flame temperatures, with maintained production rates in terms of blast air, better fuel economy and lower emissions.

Thus, a method according to the present invention will allow a blast furnace stove to be operated only on a low grade fuel such as blast furnace top gas, with no need for higher calorific value fuel enrichment and no risk for temperature-induced stove damage, while producing flue gases that are better suited for carbon capture. In addition, it allows the useful life of a stove to be prolonged.

If sufficient recycling of combustion gases is used, it is also possible to achieve the same amount and quality of blast air in an existing stove which is converted, according to what has been described above, for operation with a high-oxygen oxidant, and which stove is provided with the combustion gas recycling arrangement described in connection to FIG. 5 or 6.

Above, preferred embodiments have been described. However, it is apparent to the skilled person that many modifications may be made to the described embodiments without departing from the idea of the present invention.

For example, any one of the methods for creating recirculation of combustion gases as described in connection to FIGS. 4-6 may advantageously be supplemented with one or several of the various oxidant lances as described in connection to FIG. 3.

Moreover, the ejector-propelled recirculated combustion gases method as described in connection to FIG. 6 may advantageously be premixed with a certain amount of high-oxygen oxidant in a way similar to the one described in connection to FIG. 5.

Also, the ejector-propelling of pre-mixed or non-premixed recycled combustion gases as described in connection to FIG. 6 may advantageously be combined with ejector-propelling of low-grade fuel as described in connection to FIG. 4.

Thus, the invention shall not be limited to the described embodiments, but may be varied within the scope of the appended claims.

What is claimed is:

1. A method for heating a blast furnace stove including a combustion chamber having a combustion zone therein, comprising:
  combusting a fuel with a lower heating value (LHV) of not more than 9 MJ/Nm$^3$ in the combustion zone of the blast furnace stove,
  causing combustion gases to flow through and be exhausted from refractory material in the stove for heating said refractory material,
  supplying and adding an oxidant comprising an oxygen content of at least 85% into the combustion chamber for recirculating the combustion gases including said oxidant into the combustion zone, wherein the recirculating the combustion gases is from a location inside the combustion chamber, but outside an area of the combustion chamber occupied by the combustion zone,
  further supplying the oxidant to the combustion zone at high velocity through at least one lance, thereby entraining the combustion gases into the combustion zone for diluting of the mixture,
  diluting a mixture of the fuel and the oxidant with the recirculated combustion gases, and
  flamelessly combusting said mixture in the combustion zone.

2. The method according to claim 1, wherein the supplying the oxidant through the at least one lance is at a velocity of at least 200 m/s.

3. The method according to claim 2, wherein the supplying the oxidant through the at least one lance is at least at sonic velocity.

4. The method according to claim 3, further comprising arranging an orifice of the at least one lance adjacent to a supply inlet for the fuel for entraining said fuel into the combustion zone by ejector action.

5. The method according to claim 4, further comprising providing additional oxidant to the combustion chamber downstream of the supply inlet for the fuel for achieving staged combustion in the combustion zone.

6. The method according to claim 1, further comprising supplementing an existing air burner for the stove with at least one high-velocity oxidant lance for injecting said oxidant.

7. The method according to claim 1, further comprising recycling combustion gases flowing through the refractory material back into the combustion zone.

8. The method according to claim 7, further comprising premixing the recycled combustion gases with said oxidant before entering the combustion zone.

9. The method according to claim 7, wherein a sufficient amount of the combustion gases are recycled when total oxygen percentage by volume of an inert portion of an atmosphere in the combustion chamber, excluding non-inert fuel components, does not exceed 12%.

10. The method according to claim 7, further comprising replacing an existing air burner in the stove with a fuel inlet and an inlet for recycled combustion gases, and combusting the fuel with said oxidant.

11. A method according to claim 10, wherein a sufficient amount of the combustion gases are recycled to maintain a gas mass flow per time unit through the refractory material at a level which is at least the same as a gas mass flow per time unit used when operating the existing air burner without recycling.

12. The method according to claim 10, wherein a sufficient amount of the combustion gases are recycled to maintain a flame temperature at a level which is not more than, and a thermal energy transfer to the refractory material at a level which is not less than, the flame temperature and the thermal energy throughput per time unit, respectively, which was used when the existing air burner was operating without recycling.

13. The method according to claim 1, wherein the fuel comprises blast furnace top gas.

14. The method according to claim 13, further comprising obtaining the blast furnace top gas from a blast furnace supplied with hot air from the stove.

* * * * *